United States Patent [19]

Gerber

[11] Patent Number: 5,640,833
[45] Date of Patent: Jun. 24, 1997

[54] METHOD FOR PACKAGING PRODUCTS, PARTICULARLY FOOD PRODUCTS, AND DEVICE IMPLEMENTING SAID METHOD

[75] Inventor: Jean-Paul Gerber, Echandens, Switzerland

[73] Assignee: Sapal Societe Anonyme des Plieuses Automatiques, Ecublens, Switzerland

[21] Appl. No.: 379,369

[22] Filed: Jan. 27, 1995

[30]     Foreign Application Priority Data

Feb. 4, 1994 [FR] France ................................. 94 01368

[51] Int. Cl.⁶ ....................................................... B65B 35/30
[52] U.S. Cl. ........................... 53/443; 53/147; 53/168; 53/202; 53/251; 198/347.3; 198/369.2; 198/592; 198/594
[58] Field of Search ............................. 53/147, 154, 168, 53/202, 251, 443; 198/347.1, 347.3, 369.1, 369.2, 580, 592, 594, 601

[56]             References Cited

U.S. PATENT DOCUMENTS

| 4,166,525 | 9/1979 | Bruno ................... 198/369.2 X |
| 4,281,756 | 8/1981 | Bruno ....................... 198/369.2 |
| 4,281,757 | 8/1981 | Morton .................. 198/369.2 X |
| 4,282,964 | 8/1981 | Hogenkamp et al. ........... 198/369.2 X |
| 4,284,187 | 8/1981 | Kramer et al. ..................... 198/580 X |
| 4,553,658 | 11/1985 | Gasser ............................ 198/369.2 |
| 4,848,558 | 7/1989 | Rechsteing ..................... 198/369.2 |
| 5,078,255 | 1/1992 | Haley .......................... 198/369.2 X |
| 5,109,650 | 5/1992 | Hogenkamp ..................... 53/168 X |
| 5,287,952 | 2/1994 | Redaelli ........................ 198/369.2 |
| 5,429,223 | 7/1995 | Moeller ......................... 198/369.1 |

FOREIGN PATENT DOCUMENTS 0 057 806   8/1982   European Pat. Off. .
25 16 583  10/1976   Germany .

*Primary Examiner*—Daniel Moon
*Attorney, Agent, or Firm*—Davis and Bujold

[57]             ABSTRACT

The device implementing the method for packaging fragile, delicate food products according to the invention comprises a transfer and placement module (13) for transferring products (14) directly from a supply belt (15) onto the supply belt of the following packaging unit or onto a transverse belt (11) perpendicular to the supply belt. To accomplish this the module comprises an endless conveyor belt extending into an orientable, extendible tip (19) which receives and places products (14) on the transverse belt (11). The supply belt (15) has one movable extremity (17) which serves as a switching means between the transverse belt (11) and the following supply belt (15).

7 Claims, 4 Drawing Sheets

5,640,833

METHOD FOR PACKAGING PRODUCTS, PARTICULARLY FOOD PRODUCTS, AND DEVICE IMPLEMENTING SAID METHOD

The present invention concerns a method of packaging products, particularly fragile, delicate food products such as small chocolate wafers, patties, cookies or the like, which may or may not be chocolate-covered, and which are arranged in rows or in layers consisting of units of parallel rows, wherein the product is transferred from a supply belt on a packaging line to a transverse belt which has a conveying surface parallel to the conveying surface of the supply belt.

It further concerns a device for packaging products, particularly fragile, delicate food products such as small chocolate wafers, patties, cookies or the like, which may or may not be chocolate-covered, and which are arranged in rows or in layers consisting of units of parallel rows, wherein the product is transferred from a supply belt on a packaging line to a transverse belt which has a conveying surface parallel to the conveying surface of the supply belt.

In production lines for packaging products, particularly delicate food products such as chocolate wafers which are usually arranged in rows or small products such as patties or the like, which may or may not be chocolate-covered, the products are moved and distributed to the packaging units or wrapping machines on endless belts or conveyor belts. The wrapping devices are usually situated at the end of the transverse belts, the axes of which are perpendicular to the belts supplying the line. Each line has a device for removing the product from the supply belts and placing them on the transverse belts.

Such devices are described in Swiss Patent No. 558'749, for example. At the moment the products are placed on a transverse belt, the extremity of the upper supply belt, which has a pivoting tip, is lowered to the transverse belt which ha been displaced in translation into a receiving position. When the products are correctly placed, the transverse belt resumes the work position and takes the product to the corresponding wrapping device.

This type of device has undergone various modifications and improvements, but all have the same faults. It is not possible to work at high speed, since displacing the transverse belt translationally causes dead time and reduces speed. Furthermore, the mechanisms which translationally displace the transverse belt are complicated and costly. The transverse belt and its support form a relatively heavy unit. Overcoming inertia to displace it requires a high energy output.

The instant invention proposes overcoming these various disadvantages by providing a device and a method for the rapid, efficient and economical transfer of products arranged in rows or in layers from supply belts to transverse belts, either for distributing the products to wrapping machines or for recycling temporarily stored products and reintroducing them onto the line.

This is achieved by the method of the invention, characterized by using a transfer and placement module comprising an endless belt extending into a movable tip which can be pivoted and extended, while the supply module comprises a supply belt, said belt having one movable extremity which serves as a switch between the transverse belt and the next supply belt, and wherein the conveyor belt is designed to receive products from said supply belt during a first operating phase and then place the products on the transverse belt of a transverse module during a second operating phase by extending and lowering its orientable, extendible tip and retracting and raising the tip into position for awaiting more products.

At the end of the line there is preferably a conveyor belt for temporarily storing rows or layers of products to be recycled onto the line, said belt having one movable extremity which serves as a switching means and can transfer the stored product to the corresponding transfer and placement module.

In this method there may also be an intermediate storage station with an endless belt for temporarily storing products between two successive transverse modules corresponding respectively to two successive packaging units on the line.

This goal is also achieved by the device of the invention, characterized in that it comprises a transfer and placement module consisting of an endless belt extending into a tip which can be pivoted and extended, and a supply module comprised of the supply belt, said belt having a movable extremity serving as a means for switching between the transverse belt and the next supply belt. During a first operating phase, the conveyor belt receives products from said supply belt and during a second operating phase, it places these products on the transverse belt of a transverse module by extending and lowering its orientable, extendible tip, then retracts and raises said tip into position for awaiting more products.

Advantageously, the device also has, at the end of the line, a conveyor belt for temporarily storing rows or layers of products to be recycled onto the line, said conveyor belt having one movable extremity which serves as a switching means and transfers the stored products to said corresponding transfer and placement module.

In a preferred embodiment the endless belt of the transfer and placement module has a tension wheel which is displaceable between a first position, corresponding to the position in which the orientable, extendible tip is retracted, and a second position, corresponding to the tip being extended.

Said orientable, extendible tip is preferably pivotable and can assume a first raised position, in which it receives products originating from the supply belt, and a second lowered position, in which it places these products on the transverse belt.

In a variation of the embodiment, the device may include an intermediate storage station with an endless belt for temporarily storing products between two successive transverse modules corresponding respectively to two successive packaging units on the line.

The invention will be better understood with reference to the following description of some exemplary embodiments and to the attached drawings, wherein.

Figure 1:
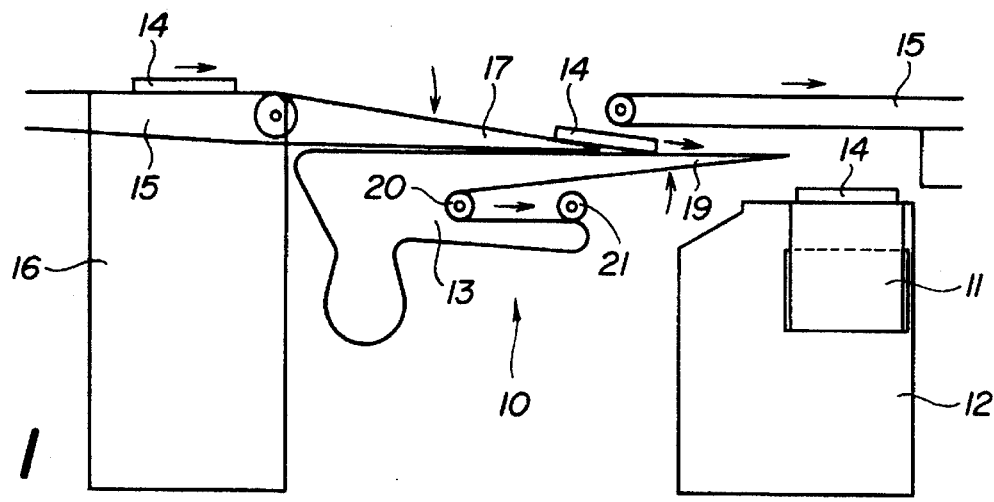
FIG. 1 is a schematic view of the device of the invention at the beginning of the transfer phase for transferring products to the transverse belt.

With reference to the drawings, device 10 as shown is inserted on the automatic packaging line upstream of a transverse belt 11 on a transverse module 12 corresponding to a packaging unit. Generally, a packaging line comprises a succession of supply belts linearly disposed, one extending from the other, which drive the products toward wrapping stations. A transverse module is associated with each wrapping station, and it removes a portion of the products moved by the upstream supply belt and takes them to the corresponding wrapping station. The products which have not been removed by the transverse belt are transferred to the downstream supply module to be driven toward one of the succeeding wrapping stations. Thus, device 10 essentially consists of a transfer and placement module 13 for products 14 which are driven by a supply belt 15 on a supply module 16. In this module, extremity 17 of the supply belt 15 is movable and pivotable between two working positions in order to serve as a switching means between the next supply belt or the transfer module 13. In a first working position, called the upper position, visible in FIG. 2, movable extremity 17 is located at the level of the supply belt 15 of the succeeding packaging unit (not shown) on the packaging line.

In a second position, called the lower position, shown in FIG. 1, movable extremity 17 is pivoted toward the transfer and placement module 13 in order to place products 14 thereon, the products preferably being arranged in rows or in layers if they are small.

Transfer and placement module 13 consists essentially of an endless conveyor belt extending into an orientable, extendible tip 19. The tip is extended when tension wheel 20 is displaced into the position shown by reference numeral 21. In the position shown in FIG. 1, tip 19 is retracted and raised. This position corresponds to the beginning of the product transfer phase or the beginning of the waiting phase. In practice, as this drawing shows, products 14 are in place on the transverse belt 11 and are in the process of being evacuated toward a wrapping machine. The next series of products 14 is transferred by movable extremity 17, in the lowered position, to orientable, extendible tip 19, which is raised and retracted. When the products have been effectively transferred, movable extremity 17 resumes its upper position and forms a connection with the next supply belt. There are two possible operating modes for transfer and placement module 13: either the products 14 on transverse belt 11 have been successfully evacuated and the transfer operation can take place; or the products have not yet been evacuated, and the next batch of products can remain in waiting position on module 13 without disturbing any functions of the other elements on the line.

Figure 2:
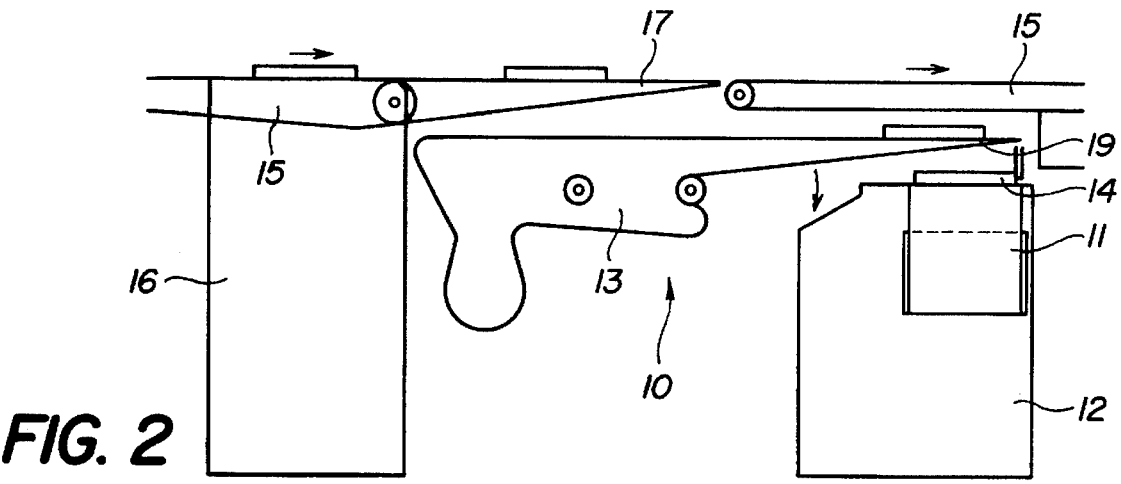
FIG. 2 is a schematic view similar to that of FIG. 1, but corresponding to an intermediate step in the transfer phase, with the products in the waiting position.
Figure 3:
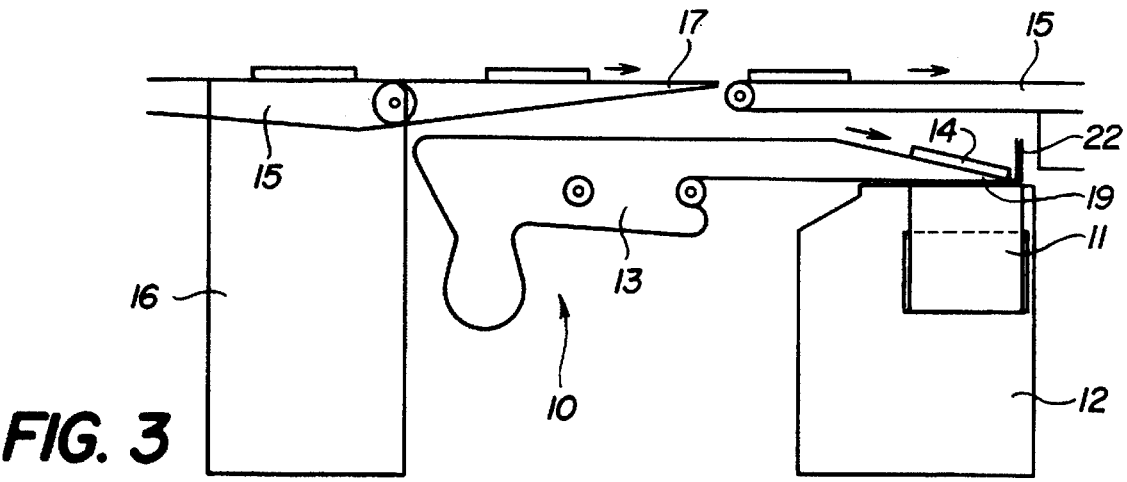
FIG. 3 is a schematic view similar to those of FIGS. 1 and 2, but corresponding to placing the products on the transverse belt.

In both instances tip 19 extends and assumes its extended position, shown in FIG. 2. When the path on transverse belt 11 is free, the tip pivots toward the lower position shown in FIG. 3 to place the products in abutment with lateral guide 22. The transfer and placement operation of products 14 is complete when the tip, still lowered, resumes the retracted position shown in FIG. 4.

Figure 4:
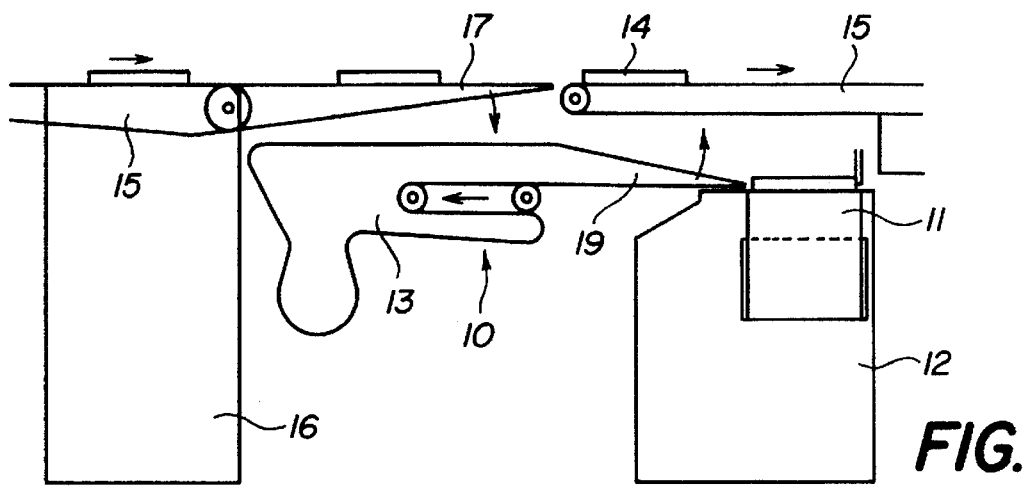
FIG. 4 is a schematic view similar to those of the preceding drawings, but corresponding to completion of product transfer.
Figure 5:
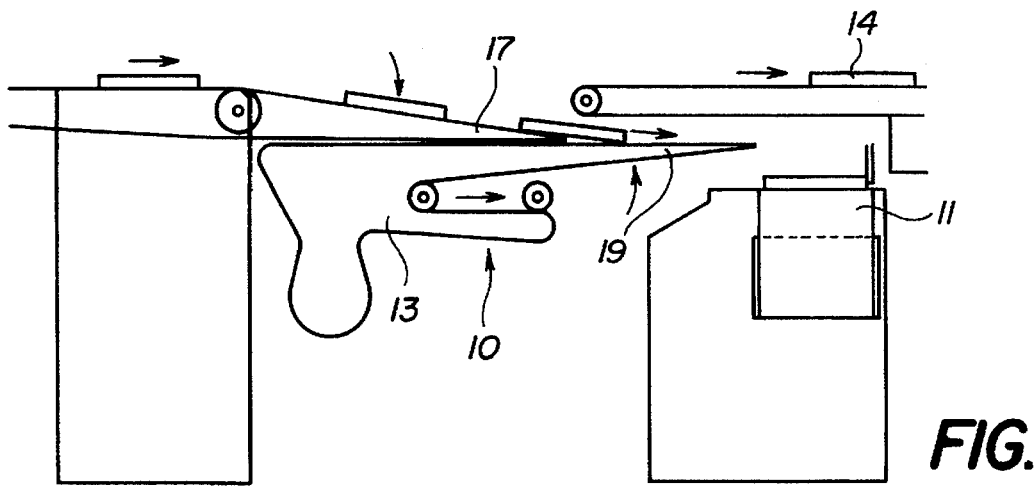
FIG. 5 shows the end of the cycle and corresponds generally to FIG. 1.

To shift from the position shown in FIG. 4 to the initial position shown in FIG. 5, and be ready to receive more products 14, orientable, extendible tip 29 is raised. This position is identical to that of FIG. 1, but in this drawing the products are proceeding at a higher speed.

Figure 6:
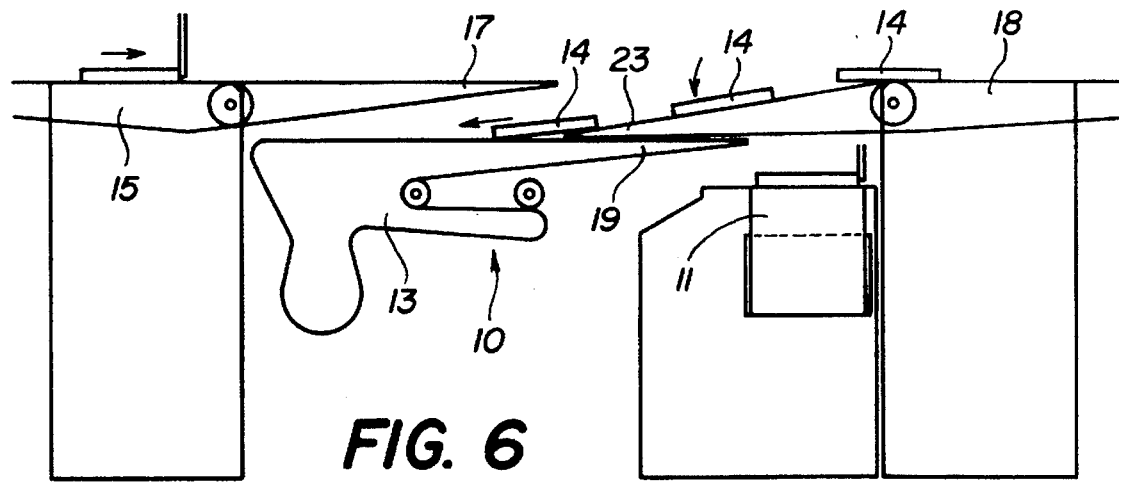
FIGS. 6 and 7 are schematic views similar to those of the preceding drawings, but illustrating the operation for recycling products temporarily stored at the end of the line.
Figure 7:
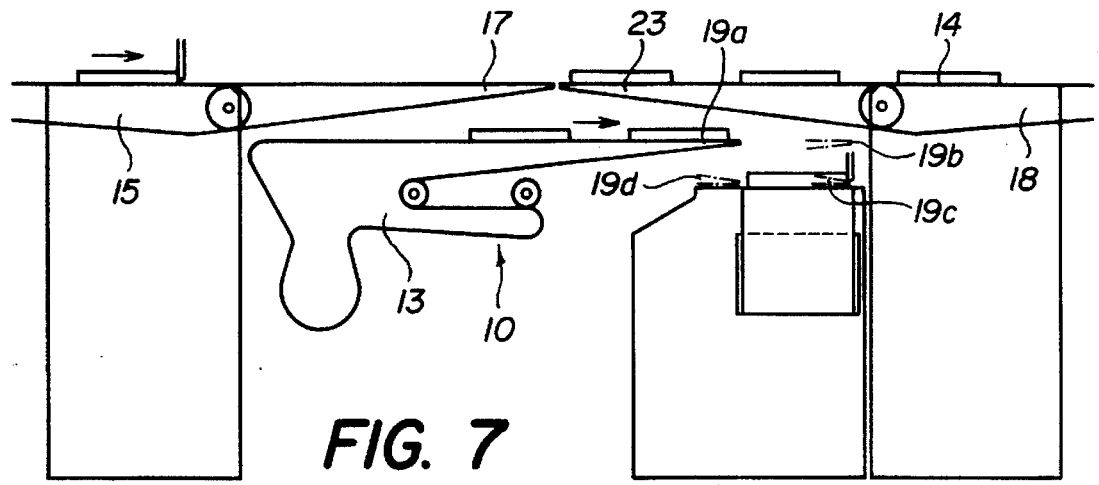

Transfer and placement module 13 may also be advantageously used to recycle products which have been temporarily stored. In this case the packaging line has at its extremity a conveyor belt 18 which serves as a storage belt and for this purpose, has one movable extremity 23 essentially identical to movable extremity 17 in both design and function. In a first phase shown in FIG. 6, the conveyor belt of module 13 turns in the opposite direction to the direction in which it turned during the operational phases previously illustrated in order to receive products 14 positioned by conveyor belt 18, the movable extremity 23 of which is in the lowered position. When the products are effectively transferred onto this belt, it is driven in the opposite direction, the operations corresponding to FIGS. 2, 3, 4 and 5 can proceed normally, and products can be transferred and placed upon transverse belt 11. These operations are illustrated diagrammatically in FIG. 7 showing positions 19a, 19b, 19c and 19b of the end of orientable, extendible tip 19. For this usage, transfer and placement module 13 is advantageously placed at the rear of the line, that is, in front of the last wrapping machine.

Figure 8:
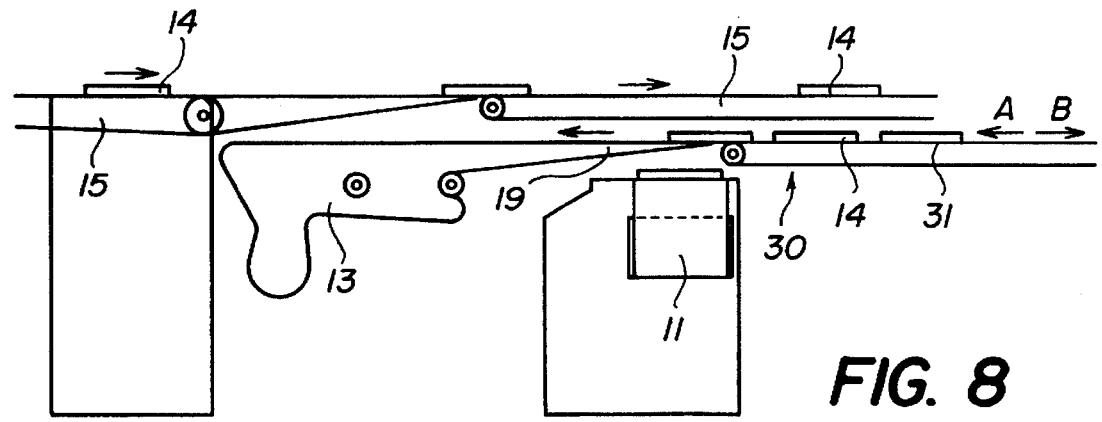
FIGS. 8 and 9 represent a variation wherein the device according to the invention is associated with an intermediate storage area.
Figure 9:
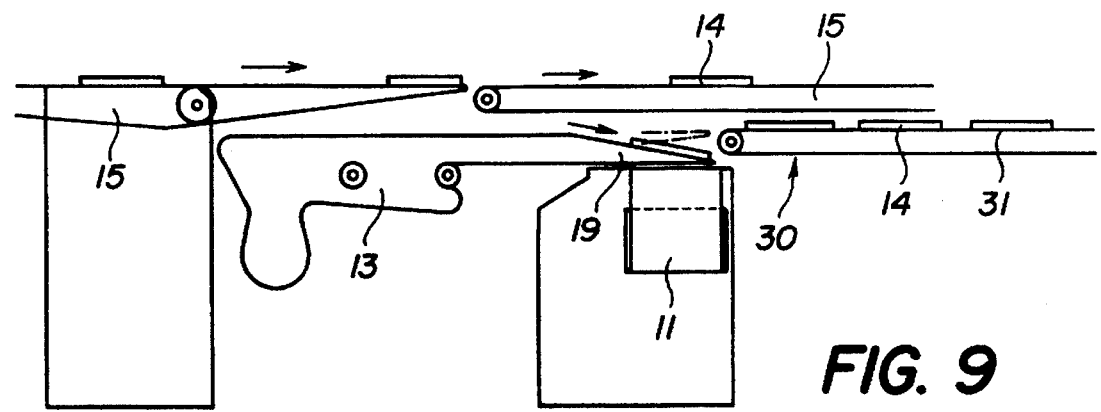

FIGS. 8 and 9 show a variation in which the transfer and placement module 13 is used as a switching means to direct the products in rows or in layers either to transverse belt 11 or to an intermediate storage area 30. This station essentially comprises an endless belt 31 displaceable in two opposite directions, shown by arrows A and B, and designed to temporarily store products, or rows or layers of products, which will then be reintroduced onto the line, or more specifically, onto the transverse belt. Endless belt 31 is below supply belt 15 of the succeeding packaging unit, that is, between two successive transverse modules.

In FIG. 8, orientable, extendible tip 19 is located at the level of endless belt 31 for transferring or receiving products. In the first case these products come from supply belt 15 and are transferred to intermediate storage station 30. In the second case, the operation is reversed.

In FIG. 9, orientable, extendible tip 19 turns toward transverse belt 11 to place on it products originating from intermediate storage station 30.

Figure 10:
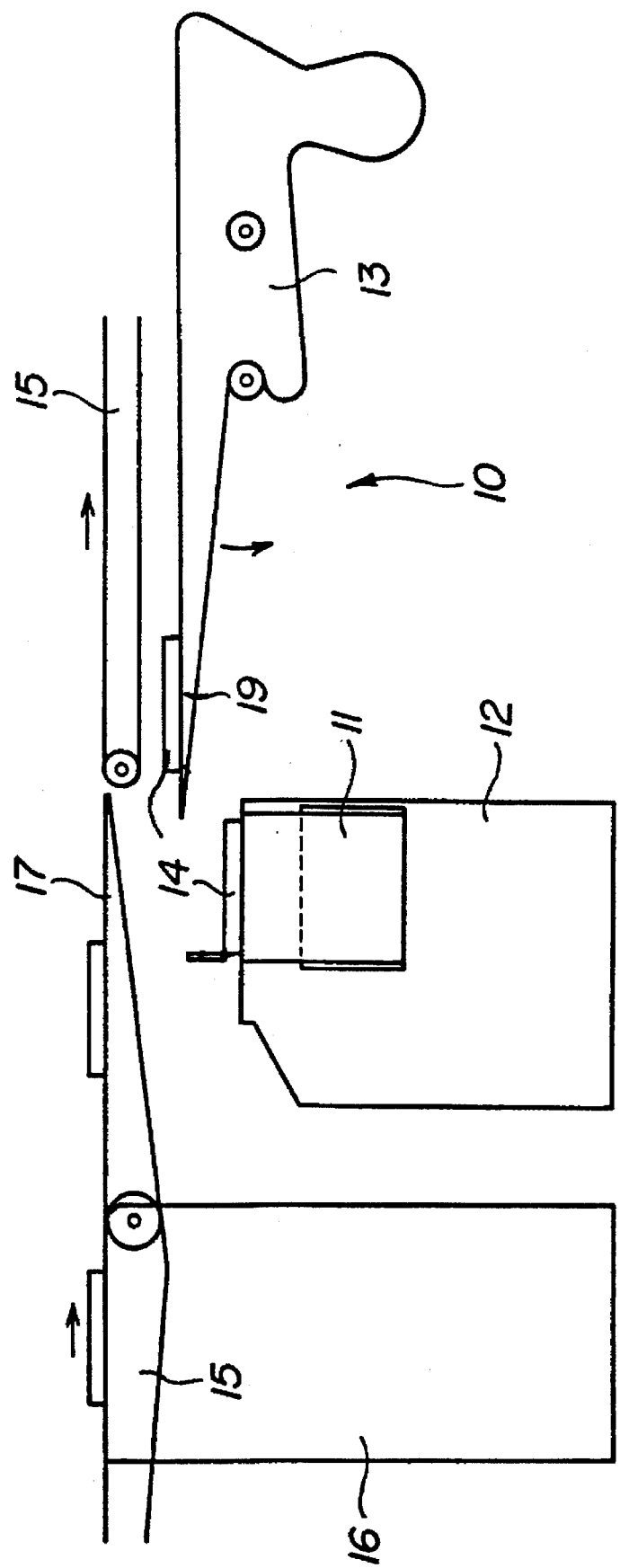
FIG. 10 shows a variation wherein the position of the transfer module is reversed.

FIG. 10 shows a variation in which the position of the transfer and placement module 13 is reversed in relation to its position in the other drawings. The unit functions identically, but this arrangement reduces its size. Products originating from supply belt 15 are placed on transfer and placement module 13 or remain on that belt, that is, they are transferred to the next portion of the belt.

The entire line consists of independent modules, thereby affording considerable flexibility not only in design, but also in the number of variations which can be constructed according to the method of the invention. The modules can be arranged to best adapt to available space and the user's requirements. Not only is maintenance greatly facilitated, but enlarging or modifying the line is easily accomplished by adding modules.

I claim:

1. A method for packaging arranged delicate food products consisting of a unit of parallel rows, comprising the following steps:

(i) transferring said products from a supply belt on a packaging line to a transfer and placement module, which module is arranged below a pivotable extremity of the supply belt and comprises an endless conveyor belt extending to a tiltable and extendible tip, by pivoting said extremity of the supply belt toward the tip of said module while said tip is horizontal and retracted, (ii) transferring said products from said module to a transverse belt, which is perpendicular to said supply belt and arranged under said module, by extending the tip of said module so that the tip extends parallel to said transverse belt wherein the end of the tip defines a vertical plane and the transverse belt lies within the vertical plane, pivoting said tip toward said transverse belt and retracting said tip during operation of the conveyor belt, wherein said products are deposited onto said transverse belt such that minimal friction exists between said products and said conveyor belt and where said module is independent from Said Supply belt and said transverse belt, and (iii) raising said tip again to the horizontal to await further products.

2. A method according to claim 1 comprising temporarily storing products to be recycled on a further supply belt and pivoting one extremity of the further supply belt from an upper, horizontal position to a lower, inclined working position, toward the tip of said transfer and placement module, to transfer the stored products to said module.

3. A method according to claim 1 comprising using an intermediate storage station provided with an endless belt to temporarily store products between more than one transverse modules set up in succession, wherein said more than one transverse module corresponds with more than one packaging units set up in succession.

4. A device for packaging arranged delicate food products consisting of a unit of parallel rows comprising:

(i) a first supply belt (15) having one extremity (17) pivotable between an upper, horizontal working position at the level of a next supply belt and a lower, inclined working position, (ii) a transfer and placement module (13) which is arranged below said pivotable extremity (17) and comprises an endless conveyor belt extending to an extendible tip (19) which is pivotable between a retracted upper, horizontal working position and an extended lower, inclined working position, at the level of a transverse belt, said transfer and placement module (13) being independent of said supply belt and said transverse belt and wherein (iii) said transverse belt (11) is perpendicular to said first supply belt (15) and is arranged under said tip (19), said pivotable extremity (17) being arranged to pivot toward said horizontally arranged tip (19) for a first transfer of the product from the first supply belt to the transfer module and said pivotable tip (19) of the transfer and placement module (13) being arranged to pivot toward said transverse belt (11) which is horizontally arranged, to complete the transfer from the tip (19) to the transverse belt (11), wherein said tip (19) in its extended position lies across said transverse belt (11) and said tip (19) pivots toward said transverse belt (11) wherein the endless conveyor belt is in operation during the retraction and removal of said tip (19) so that minimal friction exists between said products and said transfer and placement module (13 during placement of said product on said transversing belt (19).

5. A device according to claim 4 comprising a further supply belt to temporarily store products to be recycled in the device, the further supply belt being provided with one extremity which is arranged to pivot from an upper, horizontal position to a lower, inclined working position, toward the tip (19) of said transfer and placement module (13), for transferring the stored products to said module.

6. A device according to claim 4 wherein the endless conveyor belt on the transfer and placement module (13) is supported on a tension roller which is displaceable between a first position (20), corresponding to the pivotable, extendible tip (19) being retracted, and a second position (21), corresponding to the tip being extended.

7. A device according to claim 4 comprising an intermediate storage station (30) having a further endless belt (31) for temporarily storing products between more than one transverse modules set up in succession, wherein said more than one transverse module corresponds with more than one packaging units set up in succession.

* * * * *